United States Patent
Komatsu

(10) Patent No.: US 10,465,784 B2
(45) Date of Patent: Nov. 5, 2019

(54) ELECTROMAGNETIC ACTUATOR FOR A VEHICLE DIFFERENTIAL

(71) Applicant: GKN Automotive Limited, Worcestershire (GB)

(72) Inventor: Toshiaki Komatsu, West Bloomfield, MI (US)

(73) Assignee: GKN Automotive Limited, Worcestershire (GB)

( * ) Notice: Subject to any disclaimer, the term of this patent is extended or adjusted under 35 U.S.C. 154(b) by 48 days.

(21) Appl. No.: 15/838,568

(22) Filed: Dec. 12, 2017

(65) Prior Publication Data

US 2019/0178359 A1    Jun. 13, 2019

(51) Int. Cl.
| | | |
|---|---|---|
| *F16H 48/34* | (2012.01) | |
| *F16H 48/42* | (2012.01) | |
| *F16H 48/08* | (2006.01) | |
| *F16H 48/24* | (2006.01) | |

(52) U.S. Cl.
CPC ............. *F16H 48/34* (2013.01); *F16H 48/42* (2013.01); *F16H 48/08* (2013.01); *F16H 48/24* (2013.01); *F16H 2048/346* (2013.01)

(58) Field of Classification Search
CPC .......... F16H 48/06; F16H 48/24; F16H 48/34; F16H 2011/002; F16H 11/10; F16H 47/02; F16H 27/118; F16H 27/00; F16D 11/08; F16D 11/14; F16D 27/14; B60K 23/04; B60K 2023/0858; B60K 2023/046; B60K 2023/0866; B60B 35/14
See application file for complete search history.

(56) References Cited

U.S. PATENT DOCUMENTS

| | | | | |
|---|---|---|---|---|
| 2006/0160651 | A1* | 7/2006 | Petruska ................. | F16C 25/08 475/246 |
| 2015/0316110 | A1* | 11/2015 | Oram ........................ | F16H 1/06 74/405 |
| 2016/0223064 | A1* | 8/2016 | Yamanaka .............. | F16H 48/34 |
| 2017/0002875 | A1* | 1/2017 | Beesley ................ | F16D 27/118 |
| 2017/0297428 | A1* | 10/2017 | Inose .................... | F16D 27/112 |

FOREIGN PATENT DOCUMENTS

| | | | |
|---|---|---|---|
| JP | 2004183874 A | 7/2004 | |
| WO | WO 2016/135826 A1 * | 9/2016 | ............ F16D 27/112 |

* cited by examiner

*Primary Examiner* — Jeffrey A Shapiro

(74) *Attorney, Agent, or Firm* — Jennifer M. Brumbaugh; Reising Ethington P.C.

(57) ABSTRACT

A system for a vehicle differential includes a coil and a drive member movable between a first position and a second position. The drive member has an axis and includes a first body that is magnetically responsive, a second body formed at least partially from a second material that is not magnetically responsive and a third body that defines a radially inner surface of the drive member. The first body, second body and third body are coupled together with the third body being formed from a material having a lower coefficient of thermal expansion than the second body. The system may also include a lock member driven by the drive member to engage a gear of the differential in at least one position of the lock member.

17 Claims, 7 Drawing Sheets

US 10,465,784 B2

ELECTROMAGNETIC ACTUATOR FOR A VEHICLE DIFFERENTIAL

TECHNICAL FIELD

The present disclosure relates generally to an electromagnetic actuator for a vehicle differential.

BACKGROUND

During normal operation of a motor vehicle, it is common that all four wheels are not turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while transmitting torque to each wheel. While this solution may be satisfactory in some driving conditions, it is unsatisfactory under conditions where one of the driven wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates and transmit torque uniformly between two wheels in at least some circumstances.

SUMMARY

In at least some implementations, a system for a vehicle differential that has multiple gears includes a coil and a drive member movable in response to a magnetic field generated by application of electricity to the coil. The drive member is movable between a first position and a second position, has an axis and includes a first body formed at least partially from a first material that is magnetically responsive, a second body formed at least partially from a second material that is not magnetically responsive and a third body that defines a radially inner surface of the drive member. The first body and second body are coupled together and the second body and third body are coupled together with the third body being formed from a material having a lower coefficient of thermal expansion than the second body. The system may also include a lock member driven by the drive member to engage a gear of the differential when the drive member is in the second position and the lock member is adapted to be disengaged from the gear when the drive member is in the first position.

In at least some implementations, the first material is a metal and the second body includes a polymer, and the second material may be a material capable of being formed by a molding process. The second body may be sandwiched between the first body and third body, and may be coupled to both the first body and third body by separate attachment features that each include at least one void and at least one projection. The first body and third body may be formed from metal and the second body may be formed at least primarily from a polymeric material. The first body may overlap a majority of the axial length of the second body and the third body may overlap a majority of the axial length of the second body.

The system may also include a housing of the differential assembly a portion of which extends axially through the drive member, and the drive member may move relative to the housing between the first and second positions, and the material of the third body may have a coefficient of thermal expansion that is the same as or substantially similar to the coefficient of thermal expansion of the housing.

In at least some implementations, a drive member for a vehicle differential locking mechanism that is movable in response to a magnetic field between a first position and a second position, includes a first body formed at least partially from a first material that is magnetically responsive, a second body formed at least partially from a second material that is not magnetically responsive and a third body that defines a radially inner surface of the drive member. The first body, second body and third body are coupled together with the third body being formed from a material having a lower coefficient of thermal expansion than the second body.

BRIEF DESCRIPTION OF THE DRAWINGS

The following detailed description of preferred embodiments and best mode will be set forth with reference to the accompanying drawings, in which.

DETAILED DESCRIPTION

Figure 1:
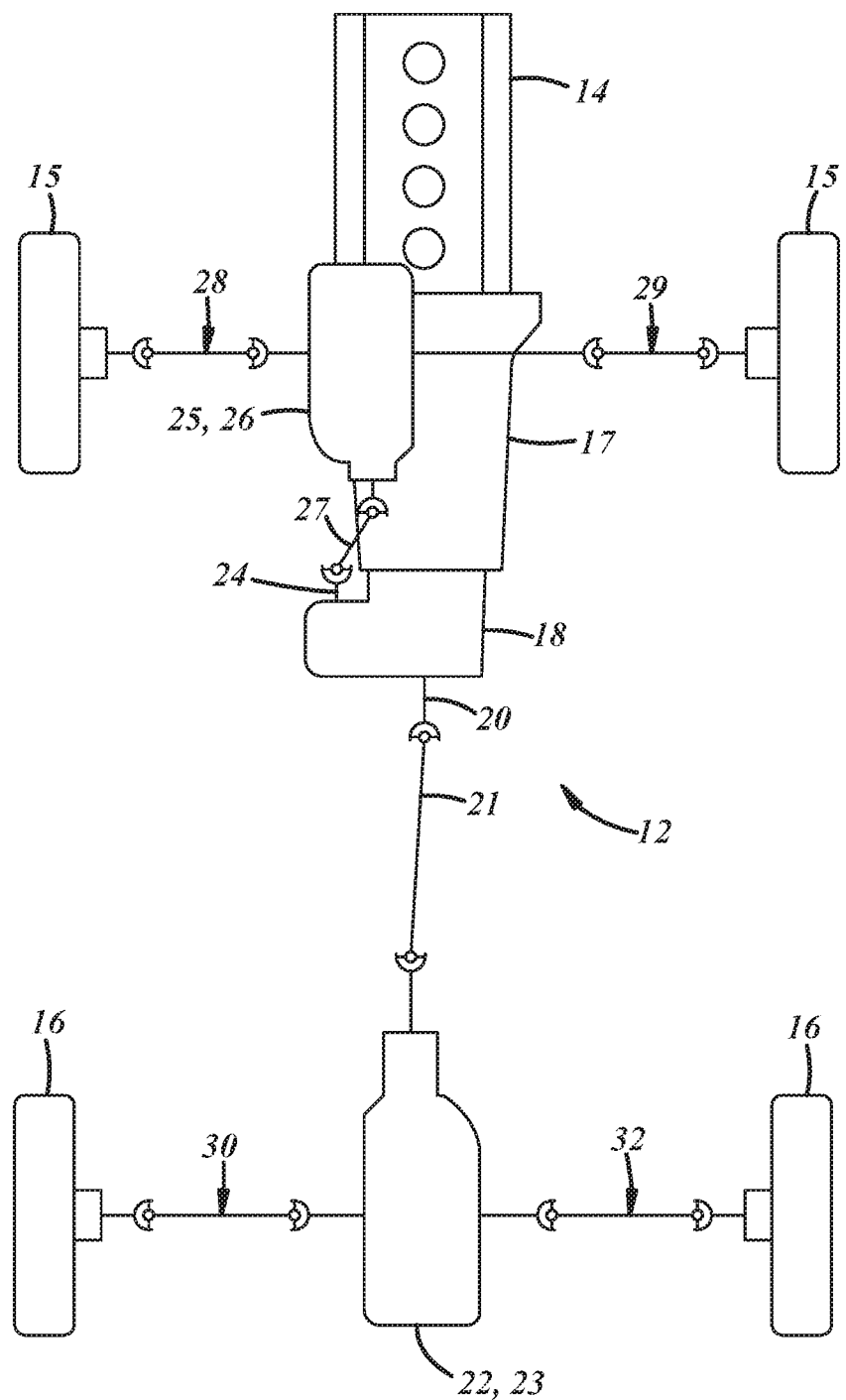
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
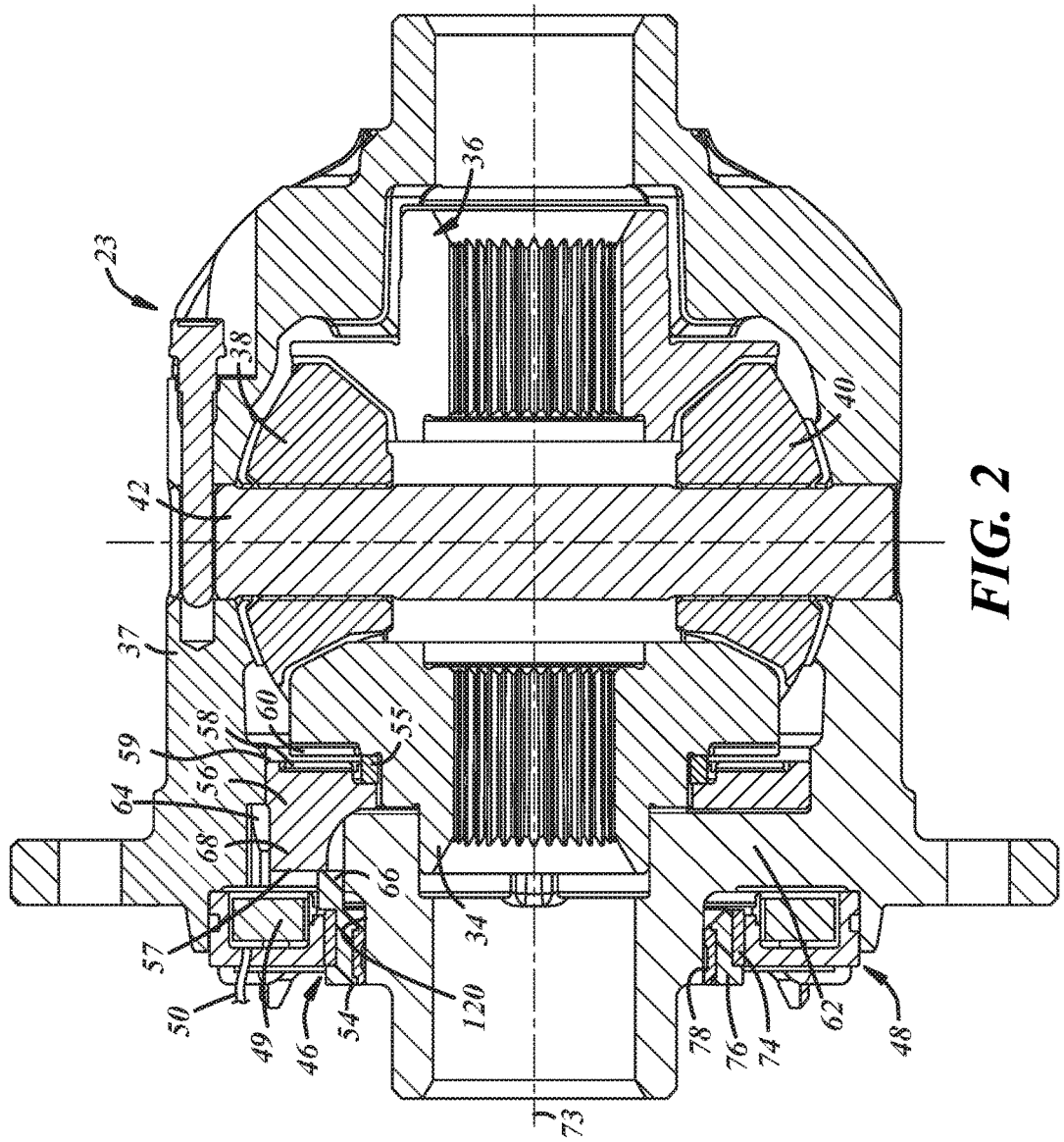
FIG. 2 is a cross-sectional view of a differential with an electrically actuated locking mechanism, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23. The differential also includes pinion gears 38, 40 that are meshed with side gears 34, 36, respectively, and which are mounted within the housing 37 on a pinion shaft 42.

To selectively lock and unlock the differential 23 a locking mechanism 46 is provided. The locking mechanism 46 may have actuated and deactuated states, and in one state the locking mechanism couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the locking mechanism 46 is electrically actuated and includes a solenoid 48 having an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the locking mechanism 46 is actuated when the plunger 54 is in the second position and the locking mechanism is deactuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with the side gear 34 as set forth below. The lock member 56 may be generally annular and a portion of the second side gear 36 and/or shaft 32 may extend through the lock member. The lock member 56 may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the first side gear 34. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes apertures 64, and the plunger 54 and lock member 56 include axially extending feet 66, 68 (e.g. FIGS. 2 and 3), respectively, that extend into or through the apertures 64 in the wall so that the plunger and lock member are engaged with each other across or through the wall. Like the coil 49 and plunger 54, the lock member 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the lock member 56 is not engaged with the side gear 34 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the lock member 56 into engagement with the side gear 34 (i.e. teeth 58 engage teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2-8 and 10, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced. In the example set forth herein, the plunger 54 needs to move between the advanced and retracted positions with sufficient force and speed to permit effective operation of the locking mechanism 46. Thus, while all materials may be affected in some way by a magnetic field, especially a field of great strength or magnitude, not all materials are magnetically responsive as that term is used in this disclosure.

For example, iron, nickel and cobalt are often cited as being magnetically responsive as they are relatively strongly affected by magnetic fields. While not limited to steel, one material of the plunger 54 may include various grades of steel which are known to be ferromagnetic and relatively strongly magnetically responsive. Conversely, materials like wood, plastic and glass are often cited as being not magnetically responsive as they are very weakly affected/attracted by magnetic fields. Of course, magnetically responsive materials may be combined with materials that are not magnetically responsive to create a component that is magnetically responsive (e.g. by mixing magnetic materials into a polymeric material).

Figure 3:
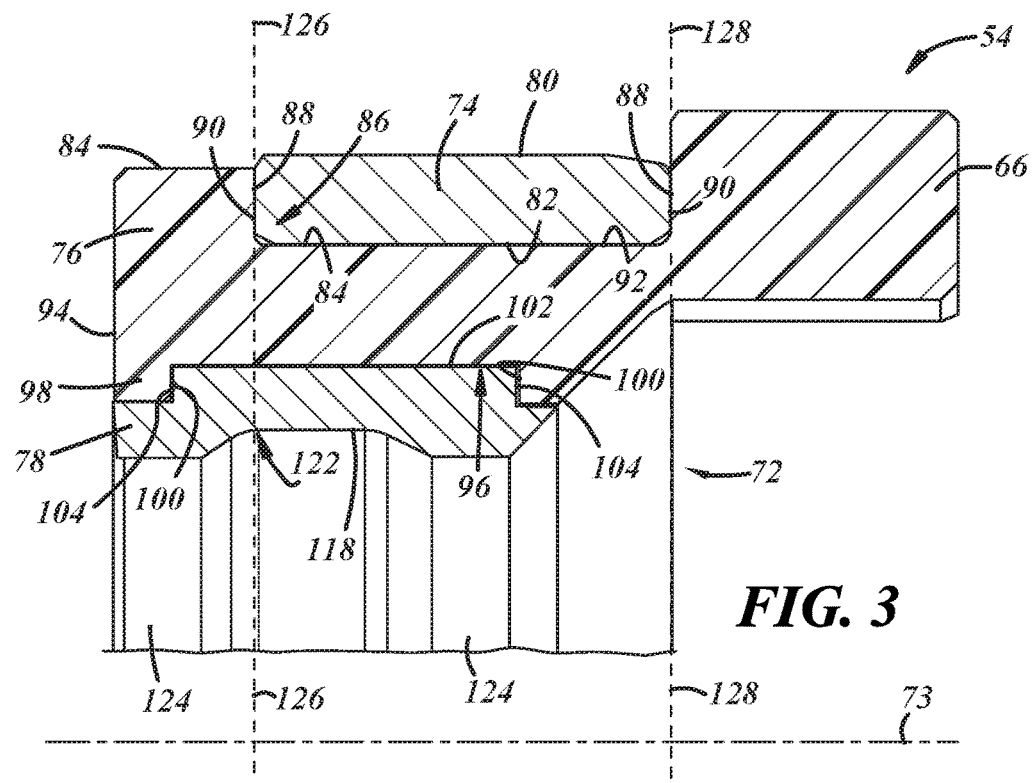
FIG. 3 is a sectional view of a portion of a plunger of the locking mechanism.

In at least some implementations, as shown in FIG. 3, the plunger 54 includes a main body 72 with a central axis 73 and which may be defined by a first body 74, a second body 76, and a third body 78 that are coupled together, such as by one or more attachment features, or by opposed and overlapped surfaces that inhibit or prevent separation of the first body, second body, and third body. Non-limiting examples of attachment features include mated projections and voids, where the projections may include flanges, tabs, fingers, tongues and the like, and the voids may include slots, holes, areas adjacent to undercut portions of a body and the like. In at least some implementations, the first body 74, second body 76 and third body 78 are integrally coupled together so that they move as a single component and are not separated during use. Further, in at least some implementations, the first body 74, second body 76 and third body 78 may be arranged so that they are not separated without destruction (e.g. cutting or breaking) of a portion of at least one of the bodies.

The first body 74 may be annular and have an outer surface 80 that defines at least part of a radially outer surface of the plunger 54. The first body 74 may be formed from a magnetically responsive material and may be received adjacent to and radially inwardly of the coil 49, with a small air gap between them. In this way, the first body 74 is within the magnetic field generated by the coil 49 and the first body is driven by the magnetic field to move the plunger 54 from its retracted to its advanced position. An inner surface 82 of the first body 74 may be engaged with or adjacent to an outer surface 84 of the second body 76. That is, the second body 76 may have at least a portion that is radially inward of at least a portion of the first body 74.

The second body 76 may be annular and may, in at least some implementations, radially overlap part of the first body 74. In the implementation shown in FIG. 3, the second body 76 defines a channel 86 with radially outwardly extending flanges 88 or walls in which the first body 74 is received, with axially opposed ends or edges 90 of the first body 74 overlapped by the flanges 88 and the inner surface 82 of the first body 74 adjacent to a base 92 of the channel 86 (which defines part of outer surface 84). In this way, the second body 76 overlaps and may be in direct contact with at least part of three of the four surfaces of the first body 74, leaving only all or part of the outer surface 80 directly exposed to the exterior of the drive member 54, and thus, the coil 49 and its magnetic field. So arranged, the first body 74 is coupled to the second body 76 so that the bodies move together. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74, if desired, and may also extend radially outwardly beyond the outer surface 80 of the first body 74, if desired (i.e. a radially outer surface of part of all of the feet 66 may be at a greater distance from the axis 73 than the outer surface 80 of the first body 74). The second body 76 may also extend axially beyond the first body to an axial face 94 opposite the feet 66.

The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. That is, the second body 76 damps, attenuates or prevents the magnetic field from passing through the second body and to other potentially magnetically responsive materials radially inward of the second body (e.g. the third body 78, the differential housing 37 or other components therein). In this way, the magnetic field is more concentrated or stronger in the area of the first body 74 to increase the magnetic flux at or in the first body and improve the responsiveness of the plunger 54 to the generated magnetic field. The second body 76 may also include one or more coupling features arranged to engage the third body 78. In the implementations of FIG. 3, the coupling feature is a channel 96 formed in the inner surface 98 of the second body 76 and defined at least in part by radially inwardly extending flanges 100 or walls.

Figure 4:
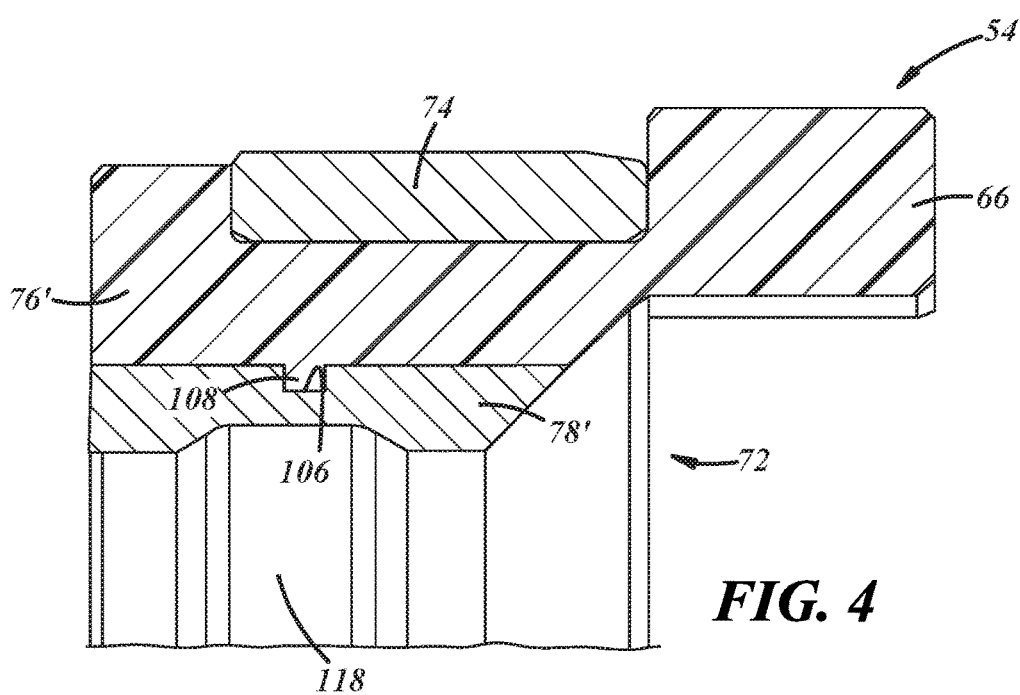
FIG. 4 is a sectional view of a portion of a plunger of the locking mechanism.
Figure 5:
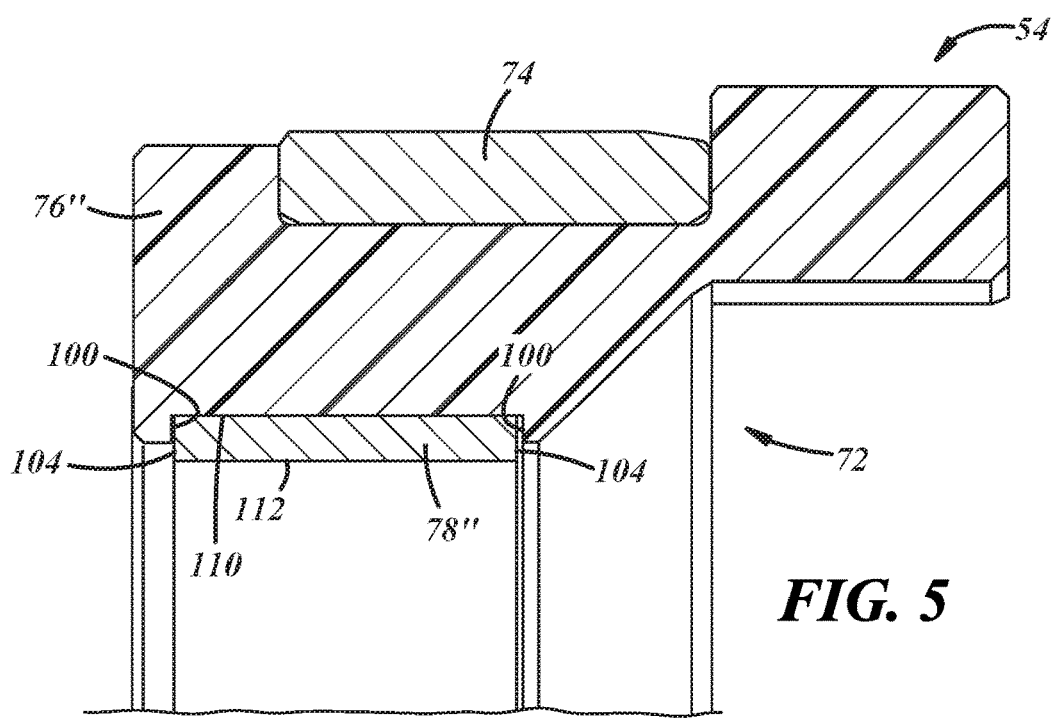
FIG. 5 is a sectional view of a portion of a plunger of the locking mechanism.
Figure 6:
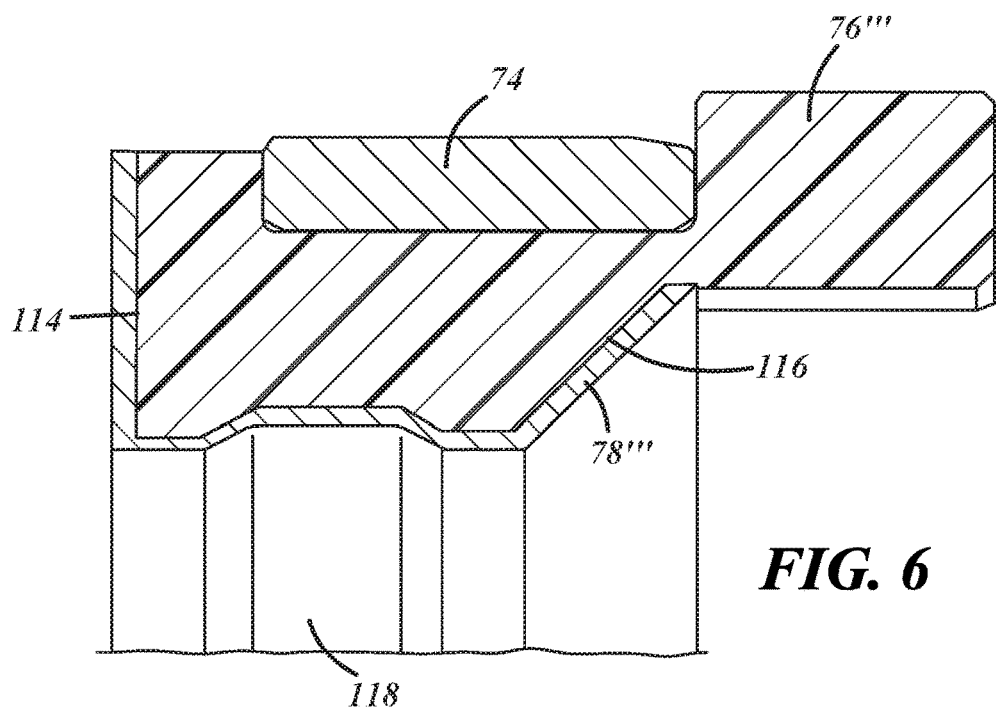
FIG. 6 is a sectional view of a portion of a plunger of the locking mechanism.

The third body 78 may be annular and include an outer surface 102 that is radially overlapped by at least part of the inner surface 98 of the second body 76, and which may be received at least partially within the channel 96 formed in the second body. At least part of the third body 78 may be overlapped to prevent or inhibit axial movement of the third body relative to the second body 76 in either axial direction. In the example shown in FIG. 3, the third body 78 includes axially opposed and radially extending surfaces 104 that are overlapped by portions of the second body 76 (e.g. the flanges 100 that define the channel 96). In FIG. 4, the third body 78' includes a radially inwardly extending groove or channel 106 and the second body 76' includes a portion 108 (which may be an annular flange) that extends into the channel in the third body. In FIG. 5, the third body 78" is received within a channel 110 of the second body 76" similar to that of the plunger in FIG. 3, but the inner surface 112 of the third body 78" in FIG. 5 is smooth and defines a constant inner diameter. In FIG. 6, the third body 78'" radially overlaps and surrounds axially opposed surfaces 114, 116 of the second body 76'". The third body 78'" may be stamped or forged, for example, and crimped to the second body 76'" or overmolded by the second body. Either body 76, 78 may overlap the other in any desired arrangement to interlock or couple the bodies together for co-movement in use. The second body 76 may also be molded onto the third body 78 such that the first and third bodies 74, 78 may be inserts in a mold and the second body may be molded around and between the first and third bodies as desired. The third body 78 could also be molded onto the second body 76 at a different time from when the second body is molded. For example, the second body 76 may be overmolded onto the first body 74 and that combined part may be provided into a mold or die used in forming the third body 78, where the third body is molded or cast in the mold to be coupled to the already coupled first and second bodies.

As shown in FIG. 3 (and also the examples of FIGS. 4 and 6), the third body 78 may have an inner surface 118 that is received adjacent to or around a surface 120 (FIG. 2) of the differential housing 37, as best shown in FIG. 2. The inner surface 118 may define a pilot diameter for receipt of the plunger 54 over an annular surface 120 of the differential housing 37 for guided linear, axial movement of the plunger relative to the differential housing. If desired for reduced friction during sliding movement of the plunger 54 or otherwise, the third body 78 may include one or more grooves or recesses 122 that reduce the surface area of material which defines the inner diameter of the third body 78 and which may engage the differential housing 37 in use. As shown in FIG. 3, a central groove 122 leaves axially spaced bearing surfaces 124 arranged to cooperate with the housing surface 120.

To reduce differences in relative dimensions of the surface 120 of the housing 37 and the inner surface 118 of the third body 78 due to thermal expansion of these components, the third body is preferably formed from a material that has a coefficient of thermal expansion that is similar to that of the differential housing or to whatever component or surface is adjacent to the inner surface of the third body. In one example, the housing 37 is formed from ductile iron and the third body 78 is formed from stainless steel, providing a ratio of coefficients of thermal expansion of 1:1.7. Other materials may be used, and in at least some implementations, the ratio of coefficients of thermal expansion between the housing and the third body is between 1:1 and 1:3 (or 3:1), with some implementations having less than a factor of 2 between the coefficients (i.e. 1:1 to 1:2 or 2:1). In at least some implementations, the coefficients of thermal expansion of the third body and housing may be the same (i.e. 1:1) or substantially similar, that is, within a factor of 3.

The material of the third body 78 may be non-magnetically responsive or it could be magnetically responsive as it is shielded by the second body 76 from the magnetic field of the coil 49. In this way, the third body 78 may be formed from a wide range of materials, which may be chosen from based upon their expansion characteristics to ensure a proper axial movement and guiding of the plunger 54 relative to the differential housing 37 over the wide range of temperatures that may be experienced by the plunger and differential housing.

In at least some implementations, a clearance between the inner surface 118 of the third body 78 and the adjacent surface of the housing 37 may be between 0.010 mm to 0.260 mm, with at least some implementations within a range of 0.030 mm to 0.185 mm. With these relatively small tolerances, the expansion and contraction of the materials can more readily affect performance. When the clearance is larger, for example, between 0.185 mm and 0.260 mm, a larger difference in the coefficients of thermal expansion may be acceptable, for example, between 1:1.7 and 1:3. When the clearance is smaller, for example, less than 0.185 mm, a lesser difference provides less of a difference in expansion and contraction and can improve performance, for example, between 1:1 and 1:2.

If the third body 78 shrinks or contracts too much more than the differential housing 37 under heat, then the plunger 54 might not move reliably or smoothly relative to the differential housing which can affect the performance and reliability of the locking mechanism (e.g. the drag force or friction may increase and reduce movement or cause the plunger to seize up on the housing). If the third body 78 expands too much relative to the differential housing 37, then the plunger 54 may tilt or skew relative to the differential housing, and this may likewise cause the plunger to become stuck or not move reliably or smoothly relative to the differential housing which can affect the performance and reliability of the locking mechanism.

Accordingly, if the plunger 54 were formed from two bodies where the first, outer body is metal and the second, inner body is plastic, then a gap may form between them as the plastic body shrinks or contracts more when cold. This may cause relative movement between the bodies that may affect the overall movement of the plunger and the reliability of the locking mechanism. Also, the plastic inner body may expand too much when heated and create undue friction with the differential housing, and/or may contract too much when cooled and allow the plunger to tilt or skew relative to the coil housing and differential housing, which may negatively affect smooth axial movement of the plunger.

While the second body 76 in the implementations noted above may be formed from plastic, it is sandwiched between the first and third bodies 74, 78, where the first body is a magnetically responsive metal and the third body has expansion properties similar to the metal differential housing 37. In this way, expansion of the material of the second body 76 is inhibited by engagement of the second body with both the first and third bodies 74, 78. Likewise, contraction of the second body 76 is limited as material flow is limited by the first and third bodies 74, 78. Thus, the second body 76 may be formed from a material having a higher coefficient of thermal expansion without affecting the performance of the plunger 54. The plastic of the second body 76 may be lighter than the material of the first body 74, may be less expensive and may be easier to form (e.g. by molding or the like).

In at least some implementations, a majority of the axial length of the second body 76 is overlapped by the first body 74 and a majority of the axial length of the second body is overlapped by the third body 78. The first and third bodies 74, 78 may overlap the same axial portion of the second body 76, or the first and third bodies may be axially offset, at least partially, as shown in FIGS. 3-6. In at least some implementations, a portion of the second body 76 is overlapped by both the first and third bodies 74, 78 (i.e. a portion of the second body between two planes that are parallel to each other, perpendicular to the axis 73 and which intersect or are contiguous with an edge of the first body or third body as shown by imaginary planes 126 and 128 in FIG. 3) and that portion may comprise a majority of the axial length of the second body 76. Further, a radially innermost portion of the second body 76 may be radially outwardly spaced from the radially innermost portion of the third body 78 by a distance greater than the amount the second body might expand when heated to temperatures experienced in differentials. Thus, in such construction and arrangements, the innermost surface of the plunger 54 is defined by the third body 78 regardless of any expansion of the second body 76.

Accordingly, in at least some implementations, the plunger 54 formed of three bodies may provide at least: 1) a desired magnetic response for the plunger due to the magnetically responsive material of the first body 74 and the magnetic shielding effect of the second body 76; 2) a desired weight of the plunger due to the plastic material of the second body which may make the plunger lighter than an all metal plunger, the lighter plunger may also be more responsive to the magnetic field (e.g. easier and faster to move in a given magnetic field; and 3) provide a desired pilot or guide surface relative to the differential housing 37 due to the similarity in thermal expansion of the third body 78 with the differential housing, which improves the movement of the plunger and the reliability of the locking mechanism.

Figure 7:
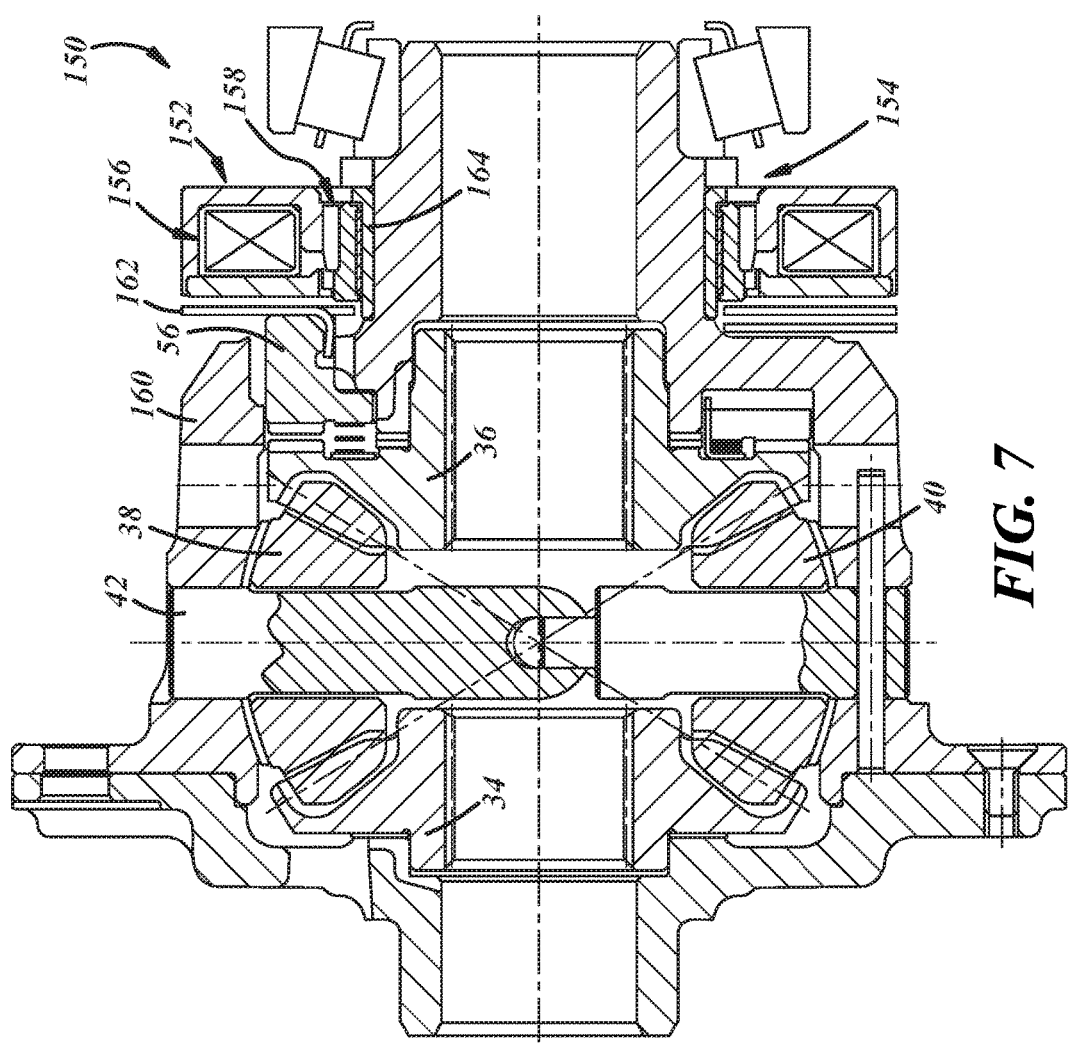
FIG. 7 is a cross-sectional view of a differential with an electrically actuated locking mechanism, wherein the differential is shown in an open position and the actuating mechanism is not integrated into a housing of the differential.

The differential 150 shown in FIG. 7 may be similar in most respects and function the same as the differential 23 shown in FIG. 2. Accordingly, components in the differential 150 of FIG. 7 that are the same as or similar to components in the differential 23 of FIG. 2 have been given the same reference numerals to facilitate an understanding of the differential 23 of FIG. 7. Further, because of the similarities, the differential 150 of FIG. 7 will not be fully described herein. Instead, only the relevant differences between the differentials 23, 150 will be described.

In that regard, the actuator 152 for the locking mechanism 154, including the solenoid 156 and the plunger 158 are not directly carried by or incorporated into the housing 160 of the differential 150 shown in FIG. 7. In this example, the solenoid 156 and plunger 158 do not rotate with the differential housing 160. To engage and move the lock member 56, a pressure plate 162 is coupled to the lock member 56 and the plunger 158 selectively engages the pressure plate 162 to move the lock member into engagement with the side gear 36. The pressure plate 162 and lock member 56 rotate relative to the plunger 158. Further, the plunger 158 is received radially outwardly of and over a housing component of the differential assembly which may be called a plunger guide 164. The plunger guide 164 is part of the solenoid assembly and the differential housing rotates relative to the guide 164. The plunger 158 is also able to rotate relative to the guide 164 (e.g. by a drag force).

Figure 8:
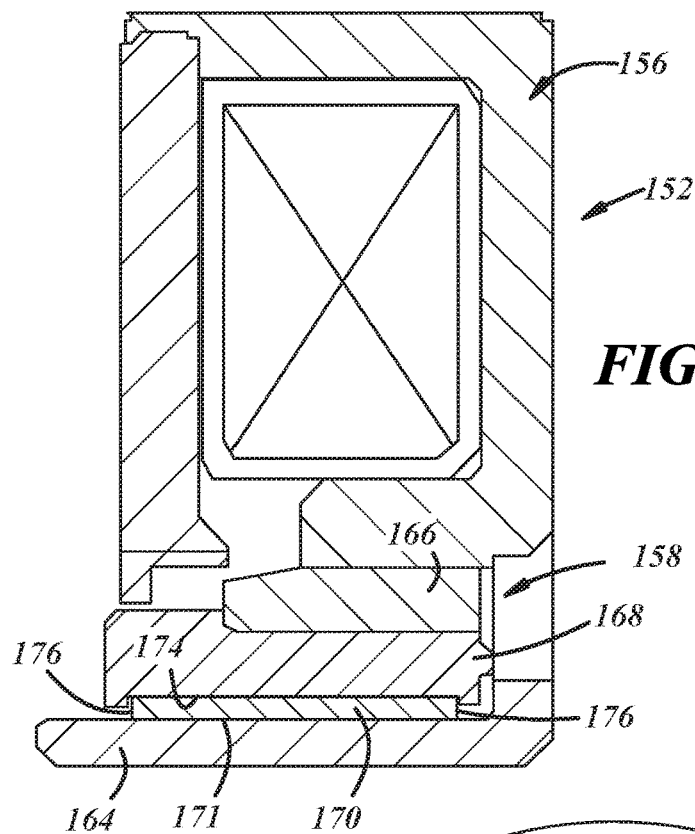
FIG. 8 is a sectional view of a portion of a solenoid and a plunger of the locking mechanism.

As best shown in FIG. 8, the plunger 158 may be formed from three bodies 166, 168, 170, similar to the plunger 54 discussed above. Each of the first, second and third bodies 166, 168, 170 may be formed from the same materials as noted above with regard to the first, second and third bodies 74, 76, 78 of the plunger 54. Further, the bodies 166, 168, 170 may be coupled together in similar ways and may be formed in similar ways as described for the bodies of plunger 54. Among other things, the first body 166 may be magnetically responsive, the second body 168 may provide a magnetic flux shield, and the third body 170 may have a radially inner surface 171 that defines an inner pilot diameter for guided axial movement of the plunger 158 relative to the plunger guide 164. In this example, the material of the third body 170 may be chosen so that its thermal expansion characteristics (e.g. coefficient of thermal expansion) are similar to those of the plunger guide 164.

Figure 9:
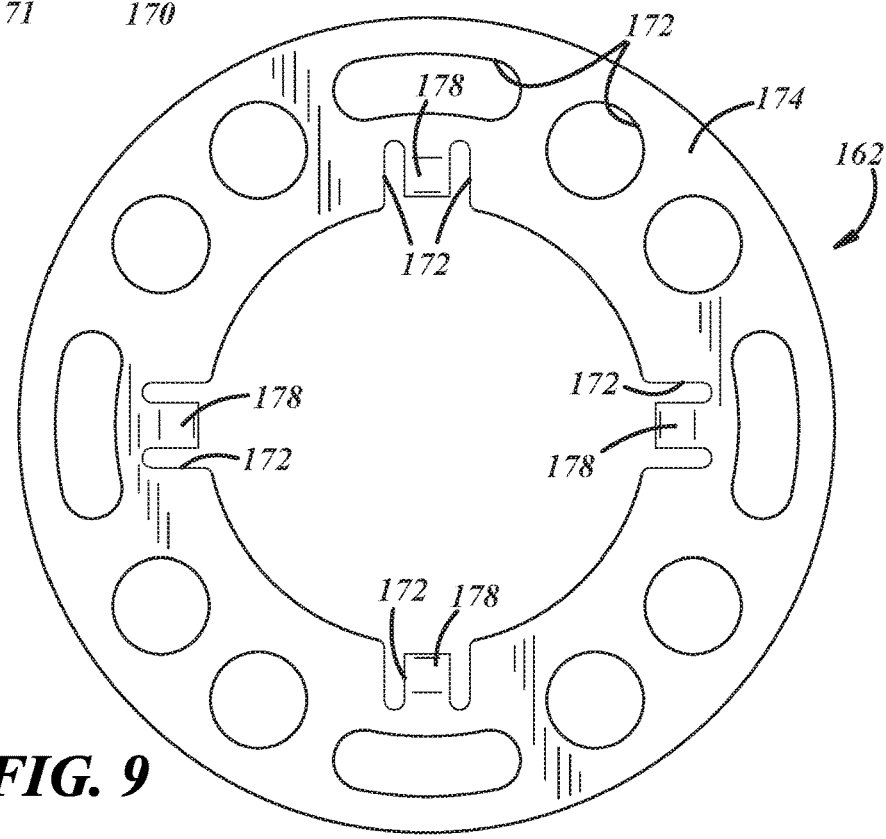
FIG. 9 is a side view of a pressure plate.
Figure 10:
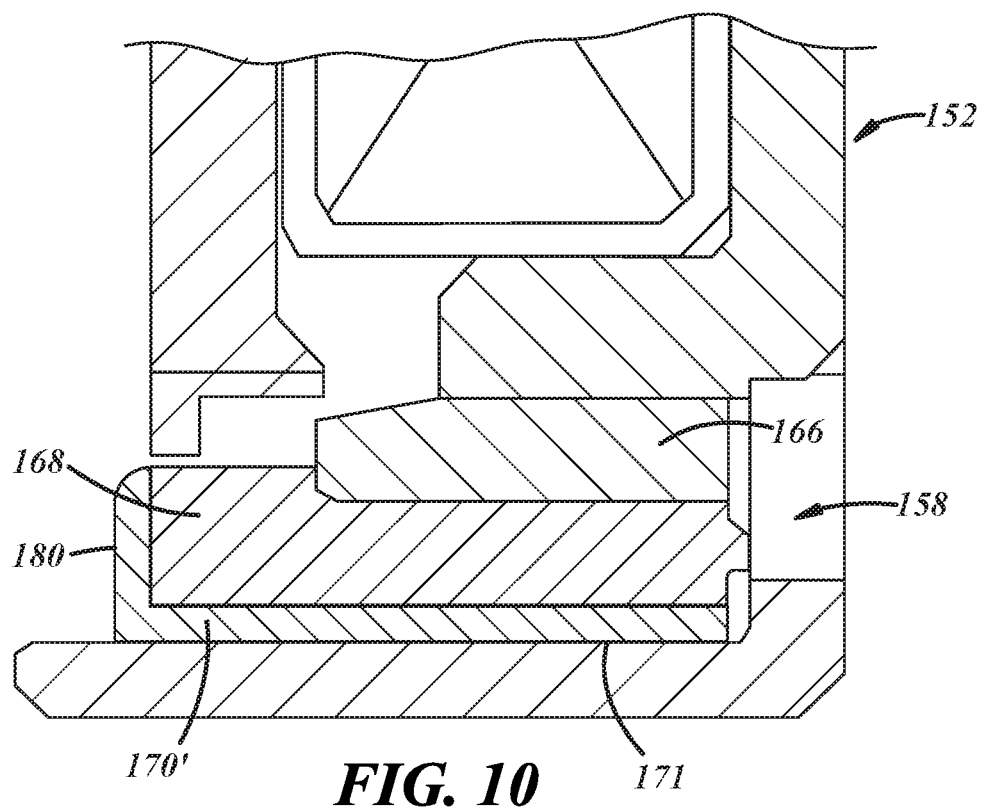
FIG. 10 is a view similar to FIG. 8 showing a modified plunger.

FIG. 9 illustrates one example of a pressure plate 162. The pressure plate 162 may have voids 172 (e.g. recess or slots) formed in its face 174 or surface that is adjacent to and engaged by the plunger 158. The pressure plate 162 may also include one or more fingers 178 that engage the lock member 56. If the plunger 158 becomes tilted or skewed, the plunger might not uniformly engage the pressure plate 162 and may bind or seize up on the plate, especially in the areas of the voids 172 which provide edges engageable by the plunger. Further, as noted above, there is relative rotation between the plunger 158 and both the pressure plate 162 and the plunger guide 164. Therefore, there can be an increased tendency for the plunger 158 to bind or seize on the plunger guide 164 or pressure plate 162. However, the dimensional control of the plunger 158 due to it being constructed as noted herein, can prevent or inhibit the plunger from binding or seizing up against the plunger guide 164, and can facilitate reliable engagement and displacement of the pressure plate 162 and lock member 56. This is due at least in part to the similarity in expansion of the third body 170 and the plunger guide 164, and the reduction in the expansion or contraction of the second body 168 as it is sandwiched between the first and third bodies 166, 170. Bushing or bearing material may also be provided on the inner surface of the third body to avoid binding or seizing up during rotation of the plunger relative to the guide.

In the example shown in FIGS. 7-9, the third body 170 is received within a channel 184 and has axially opposed edges 176 that are radially overlapped by the second body 168. The inner surface 171 of the third body 170 is shown as having a constant diameter, but the inner surface could include grooves or the like to reduce the surface area that might engage the plunger guide 164. In the example shown in FIG. 10, the third body 170' extends axially beyond the second body 168 and radially overlaps the second body. This axially outer face 180 of the third body 170' may engage the pressure plate 162. When the third body 170' is formed from metal, the wear on the plunger 158 from engaging the relatively rotating pressure plate 162 may be reduced as compared to a plunger that engages the pressure plate with a plastic surface as shown in FIG. 9.

Representative but non-limiting examples of materials: for the first body include: iron, carbon/alloy steel (e.g. cast, forged or otherwise formed); and for the second body include stainless steel, plastic, aluminum, rubber, glass; for the third body include iron, steel, stainless steel, copper, bushing materials; and for the differential housing include ductile iron, cast iron, steel, forged steel. Of course, other materials can be used and, as noted above, the possibilities for the second body are particularly diverse due to the construction and arrangement of the plunger as set forth above. Further, while shown as separate bodies that are coupled together, the first, second and third "bodies" may be portions of a more congruous body of the drive member. That is, the portions might be more intermingled and less distinct while still achieving at least some of the significant benefits and advantages set forth herein. As one example, one or more of the first, second and third bodies might not be a continuous annulus, and might instead be defined by separate segments or portions. Taking that example further, and by way of one non-limiting example, the third body might be defined by or include portions or segments of material that are carried by the second body and are arranged to define a discontinuous inner surface, which may be of generally constant diameter, to, for example, reduce surface area contact with the differential housing and reduce friction between the drive member and differential housing.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more example embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A system for a vehicle differential that has multiple gears, the system comprising:
   a coil;
   a drive member movable in response to a magnetic field generated by application of electricity to the coil, the drive member being movable between a first position and a second position, the drive member having an axis and including a first body formed at least partially from a first material that is magnetically responsive, a second body formed at least partially from a second material that is not magnetically responsive and a third body that defines a radially inner surface of the drive member, the first body, second body and third body are coupled together with the third body being formed from a material having a lower coefficient of thermal expansion than the second body; and a lock member driven by the drive member to engage a gear of the differential when the drive member is in the second position and the lock member is adapted to be disengaged from the gear when the drive member is in the first position.

2. The system of claim 1 wherein the first material is a metal and the second body includes a polymer.

3. The system of claim 1 wherein the second material is a material capable of being formed by a molding process.

4. The system of claim 1 which also comprises a housing of the differential assembly a portion of which extends axially through the drive member, and wherein the drive member moves relative to the housing between the first and second positions, and wherein the material of the third body has a coefficient of thermal expansion that is the same as or substantially similar to the coefficient of thermal expansion of the housing.

5. The system of claim 1 wherein the second body is sandwiched between the first body and third body.

6. The system of claim 5 wherein the second body is coupled to both the first body and third body, and is connected to the third body by attachment features that include at least one void and at least one projection.

7. The system of claim 1 wherein the drive member has at least one axially extending foot which is defined at least partially by the second body.

8. The system of claim 1 wherein the first body has an outer surface defining an outer diameter of the first body and at least a portion of the outer surface is exposed to the exterior of the drive member and is located between the coil and at least part of the second body.

9. The system of claim 7 wherein an outer surface of the first body is at a first radial distance from the axis and the at least one foot extends radially outwardly relative to the first body so that a radially outer surface of the foot is at a greater radial distance from the axis than is the outer surface of the first body.

10. The system of claim 9 wherein the foot is located radially outwardly of the entire third body.

11. The system of claim 4 wherein the first body and third body are formed from metal and the second body is formed at least primarily from a polymeric material.

12. The system of claim 5 wherein the first body overlaps a majority of the axial length of the second body and the third body overlaps a majority of the axial length of the second body.

13. A drive member for a vehicle differential locking mechanism that is movable in response to a magnetic field, the drive member being movable between a first position and a second position, the drive member having an axis and including a first body formed at least partially from a first material that is magnetically responsive, a second body formed at least partially from a second material that is not magnetically responsive and a third body that defines a radially inner surface of the drive member, the first body, second body and third body are coupled together with the third body being formed from a material having a lower coefficient of thermal expansion than the second body.

14. The drive member of claim 13 wherein the first material is a metal and the second body includes a polymer capable of being formed into the second body by a molding process.

15. The drive member of claim 13 wherein the second body is sandwiched between the first body and third body.

16. The drive member of claim 15 wherein a majority of the axial length of the second body is overlapped by the first body which is located radially outwardly of the portion of the second body, and a majority of the axial length of the second body is overlapped by the third body which is located radially inwardly of the portion of the second body.

17. The drive member of claim 13 wherein the first body includes an annular outer surface at a first radial distance from the axis and at least one foot extends radially outwardly relative to the first body so that a radially outer surface of the foot is at a greater radial distance from the axis than is the outer surface of the first body.

\* \* \* \* \*